(12) United States Patent
Haft et al.

(10) Patent No.: US 11,092,512 B2
(45) Date of Patent: Aug. 17, 2021

(54) OPTICAL TABLE

(71) Applicant: ATTOCUBE SYSTEMS AG, Munich (DE)

(72) Inventors: Dirk Haft, Haar (DE); Florian Otto, Rosenheim (DE); Claudio Dal Savio, Baldham (DE); Khaled Karrai, Munich (DE)

(73) Assignee: ATTOCUBE SYSTEMS AG, Munich (DE)

( * ) Notice: Subject to any disclaimer, the term of this patent is extended or adjusted under 35 U.S.C. 154(b) by 405 days.

(21) Appl. No.: 15/518,646

(22) PCT Filed: Oct. 22, 2015

(86) PCT No.: PCT/EP2015/002092
§ 371 (c)(1),
(2) Date: Apr. 12, 2017

(87) PCT Pub. No.: WO2016/062404
PCT Pub. Date: Apr. 28, 2016

(65) Prior Publication Data
US 2017/0234766 A1 Aug. 17, 2017

(30) Foreign Application Priority Data
Oct. 23, 2014 (DE) .......................... 102014015665.6

(51) Int. Cl.
*F25D 3/10* (2006.01)
*G01M 11/04* (2006.01)
(Continued)

(52) U.S. Cl.
CPC ............... *G01M 11/04* (2013.01); *F25B 9/14* (2013.01); *F25B 19/005* (2013.01); *F25B 21/00* (2013.01);
(Continued)

(58) Field of Classification Search
CPC .......... G01M 11/005; G01M 11/0214; G01M 11/04; F25B 19/005; F25B 2500/13; F25D 19/00; F25D 3/01
(Continued)

(56) References Cited

U.S. PATENT DOCUMENTS 4,161,747 A * 7/1979 Frosh .................. H01S 5/02423
165/185
4,954,713 A * 9/1990 Le Bris .............. G01R 31/2656
250/458.1
(Continued)

FOREIGN PATENT DOCUMENTS

JP 2007-098506 A 11/2007

OTHER PUBLICATIONS

Jerome Degallaix et al. 2012 J. Phys.:Conf. Ser. 363 012008 "The New Cryogenic Facility at LMA".*
(Continued)

*Primary Examiner* — Filip Zec
(74) *Attorney, Agent, or Firm* — Abelman, Frayne & Schwab

(57) ABSTRACT

The invention relates to a coolable optical table with a table top and at least three table legs. Securing means for securing objects such as optical elements are provided in a table surface of the table top. The table legs are equipped with a damping device for damping vibrations.

15 Claims, 7 Drawing Sheets

Figure 1:
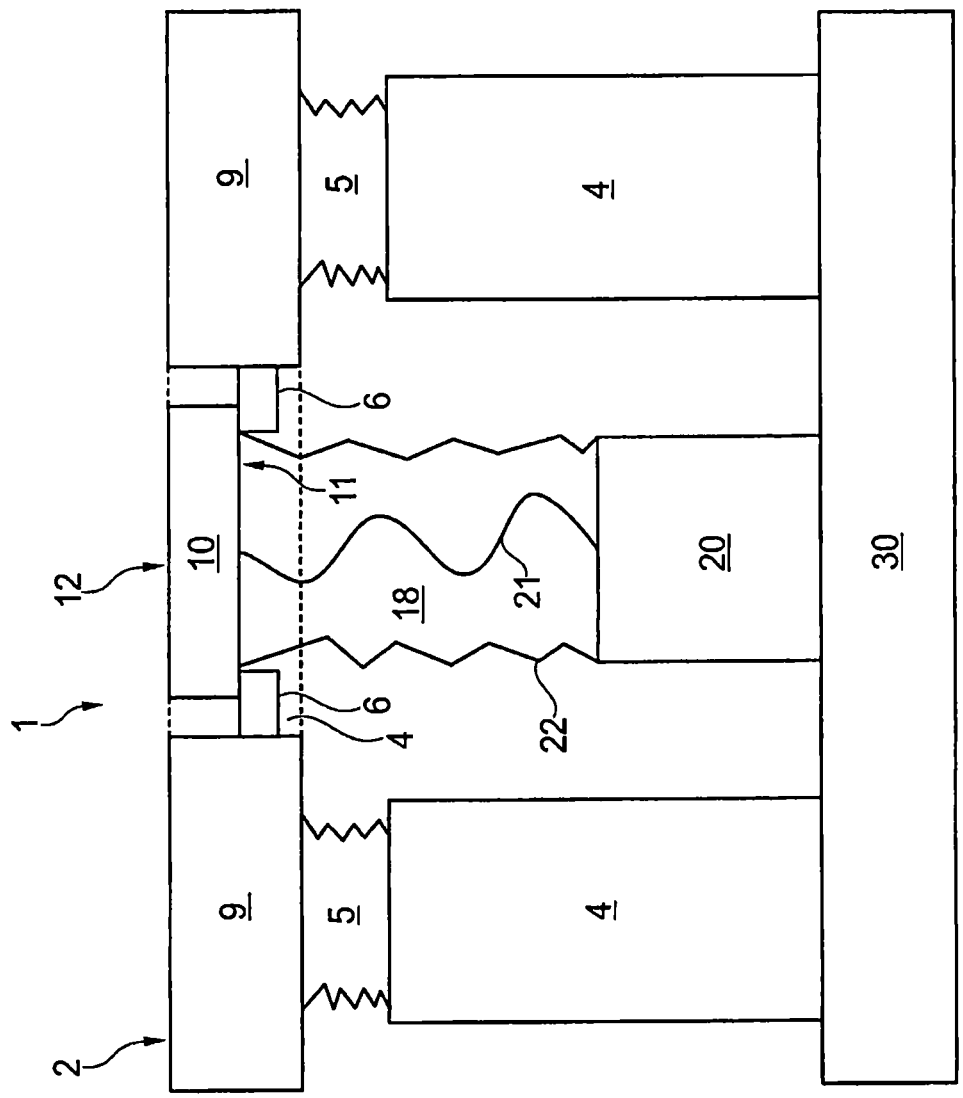

(51) Int. Cl.
  *F25B 9/14* (2006.01)
  *F25B 19/00* (2006.01)
  *F25B 21/00* (2006.01)
  *F25D 19/00* (2006.01)
  *G01M 11/00* (2006.01)
  *G01M 11/02* (2006.01)

(52) U.S. Cl.
  CPC .............. *F25D 3/10* (2013.01); *F25D 19/00* (2013.01); *G01M 11/005* (2013.01); *G01M 11/0214* (2013.01); *F25B 2500/13* (2013.01)

(58) Field of Classification Search
  USPC .................................. 62/600–657, 45.1–54.3
  See application file for complete search history.

(56) References Cited

U.S. PATENT DOCUMENTS

| | | | | |
|---|---|---|---|---|
| 5,327,733 | A * | 7/1994 | Boolchand | B01L 9/00 248/636 |
| 8,307,665 | B2 * | 11/2012 | Nagamune | F25D 19/006 62/51.1 |
| 8,516,834 | B2 * | 8/2013 | Snow | F25B 9/14 62/51.1 |
| 8,746,008 | B1 * | 6/2014 | Mauritsen | F25B 1/10 62/510 |
| 8,844,298 | B2 * | 9/2014 | Woidtke | F25D 19/006 248/636 |
| 9,511,509 | B2 * | 12/2016 | Anderssohn | F16F 7/108 |
| 10,208,742 | B2 * | 2/2019 | Roscher | F04B 39/0027 |
| 2005/0126187 | A1 * | 6/2005 | Li | F25B 9/14 62/6 |
| 2010/0050661 | A1 * | 3/2010 | Snow | F25B 9/14 62/51.1 |
| 2010/0089069 | A1 * | 4/2010 | Hoehne | F25D 19/00 62/6 |
| 2012/0085212 | A1 * | 4/2012 | Cantella | B26D 5/34 83/365 |
| 2015/0276488 | A1 * | 10/2015 | Veprik | F17C 13/006 62/51.1 |

OTHER PUBLICATIONS

Notification of Reasons for Refusal—JP patent appln No. 2017-521555, dated Jul. 9, 2019.
German Office Action dated Oct. 21, 2019 for German patents application No. DE 15 787 460.3 to Attocube Systems AG.
Jerome Degallaix et al.: "The New Cyogenic Facility at LMA" Journal of Physics: Conference Series, Institute of Physics Publishing, Bristol, GB, Bd 363, Nr. 1, Jun. 1, 2012, Seite 1200, XP020224660, ISSN: 1742-6596, DOI: 10.1088/1742-6596/363/1/012008.
EPO—Notification in Accordance with Article 94 (3) EPC for Appln No. 15787460.3-1009 , dated May 11, 2020.
N.N.: "TMC Resource Guide 12", Dec. 31, 2012 (Dec. 31, 2012), Seiten 1-124, XP55691567, Gefunden im Internet: URL:http//www.gmp.ch/pdf/catalogues/TMC_Catalog2012.pdf (gefunden am May 5, 2020).
Extended European Search Report for Appln No. 15787460.3 , dated Feb. 24, 2020.
N. N.: Optical Tops, Breadboards, & Supports, 30×72 0 30×96 0.75×2.4 784-492 784-692 30×120 0, Mar. 16, 2009; XP055245730.
TMC Vibration Control: "part 1—TMC Optical Table Setup Video", Youtube, Jan. 8, 2014, Seite 1 pp., XP054980225, URL: https://www.youtube.com/watch?v=GGXKWkAqjvo [found am Feb. 17, 2020].

* cited by examiner

OPTICAL TABLE

CROSS REFERENCE TO RELATED APPLICATION

This application claims the benefit under 35 U.S.C. § 371 to international application No. PCT/EP2015/002092, filed on Oct. 22, 2015, which claims priority to German application no. DE 10 2014015665.6, filed on Oct. 23, 2014, the contents of which are incorporated by reference herein in their entireties.

The invention relates to an optical table with a table top and at least one table leg. Securing means for securing objects are provided in a table surface of the table top. The at least one table leg is equipped with a damping device for damping vibrations.

In many high-precision and correspondingly highly sensitive optical experiments, such as for example those of the ultra-high resolution and consequently highly sensitive Super Resolution Optical Microscopy or also of quantum optics, complex measuring systems made up of a plurality of optical components are arranged on optical tables. The measurement accuracy is limited by environmental influences such as vibrations, thermal effects or electromagnetic noise. Therefore, many such experiments are carried out under conditions which are as low-vibration as possible and are also cryogenic at the location of a sample to be measured. In the state of the art, cryocoolers such as cryostats are arranged above or on the optical table.

The invention sets itself the object of creating an optical table on which optical experiments of various designs can be carried out flexibly and simply at the highest resolution.

This object is achieved by an optical table with a table top and at least one table leg, preferably at least three table legs, which comprises the following features. Securing means for securing objects are provided in a table surface of the table top. The table legs are equipped with a damping device for damping vibrations. The optical table further has integrated cooling. For this purpose, a cryocooler is provided underneath the table top for cooling a cryogenic plate, wherein the cryogenic plate is in thermal contact with the cryocooler and can be cooled by the latter. A through hole in the table top is provided above the cryocooler. The cryogenic plate is arranged—in particular in a form-fitting manner—in this through hole.

An optical table serves to mechanically hold objects of which an optical system is made up in a stable and low-vibration manner. These objects can, for instance, be optical elements such as mirrors, lenses and laser sources or sample holders.

The table top is characterized by high rigidity and has a flat table surface. The table top is connected to a substructure with an integrated damping device. The securing means for securing the objects can be an, in particular, regular pattern of threaded holes for receiving brackets of the objects or for receiving magnets integrated in the table top for fixing magnetic feet of the objects or even adhesive. Securing means can be provided both in the table top and also on the upper plate surface of the cryogenic plate.

The substructure can consist of one, two, three, four or more table legs. The table legs can be designed to be height-adjustable in order to align the table surface horizontally even when the optical table is standing on an uneven floor. The table legs can comprise a common damping device or one each for damping the vibrations of the table top on the surface of which sensitive optical experiments are to be carried out. A damping device is a system for damping mechanical oscillations such as vibrations, shaking and bumping, which can usually convert kinetic energy into heat energy.

The damping device according to the invention can comprise a friction brake and/or resonant systems. It can, for example, be a mat made of elastic material such as rubber or a spring device, a hydraulic suspension, an active piezoelectric damping control unit, which, for example in a time- and direction-resolved manner, detects the forces acting on the table piezoelectrically and compensates, by means of a control unit, with counter-forces likewise generated by piezoelectric actuators acting on the table, forces of the table movement or a compressed-air suspension or a combination thereof.

The optical table according to the invention further has integrated cooling, which comprises a cryocooler for cooling a cryogenic plate underneath the table top.

The cryocooler can be a set-up of cooling systems and a pumping unit. The cooling systems consist, for example, of absorption cooling systems, adsorption cooling systems, diffusion absorption refrigerators, compression cooling systems, steam jet cooling system, Joule-Thomson effect, pulse tube refrigerators, ion getter pumps, Peltier elements, magnetic cooling elements, evaporative coolers and/or cryostats. The pumping unit can be a set-up of pumps with moving parts such as turbopumps and diaphragm pumps as well as pumps with non-moving parts such as ion getter pumps or cryopumps. Advantageously, these components of the cryocooler are designed to be low-vibration and/or mechanically decoupled from the table top.

The table top and the cryogenic plate, on which precision measurements which are prone to disturbance are intended to take place, are thus advantageously decoupled from the vibrations starting from the cryocooler. The arrangement of the cryocooler underneath the table top has the advantage that the sample to be examined, which is arranged on the upper plate surface of the cryogenic plate, and the optical and measurement set-up necessary therefor can be arranged flexibly from above in the plane of the table surface, because it is not subject to any restrictions by the cooling system or the feed lines thereof.

The through hole in the table top can be formed to receive the cryogenic plate in a form-fitting and/or rigidly connected manner.

Furthermore, a reinforcing structure is preferably provided between, the cryocooler and at least one table leg, wherein the reinforcing structure is particularly preferably rigidly connected to the at least one table leg underneath the damping device, with the result that the damping device can cushion the table top with respect to the cryocooler and the areas with which the table legs stand on the floor. In the simplest case, the reinforcing structure can also be the floor under the table on which all of the feet of the table are supported and to which the cryocooler is fixed, preferably by the force of gravity. The cryocooler is preferably supported on the reinforcing structure and is connected to it, preferably also sufficiently weighted such that it is fixed by the force of gravity.

The reinforcing structure can preferably be a plate or a framework with holding devices, which connects the cryocooler and at least one table leg or also all of the table legs underneath the respective damping device, preferably rigidly. The reinforcing structure can also consist of the floor underneath the table and the cryocooler can be fixed, for example, via an extra weight which fixes the cryocooler to the floor. The reinforcing structure or the floor underneath the table is preferably made from a warp-resistant material such as steel or slate. The damping device can thus cushion the table top with respect to the cryocooler and the areas with which the table legs stand on the floor. The cryocooler and optionally the table legs are supported on the reinforcing structure and are connected to it.

Embodiments of the optical table according to the invention comprise the features of one or more of the following designs.

According to a design according to the invention, an upper plate surface of the cryogenic plate is flush with the table surface of the table top with the result that the table surface and the upper plate surface of the cryogenic plate lie in a common working plane. This makes it easier to align objects such as optical elements.

According to a further design according to the invention, securing means for securing objects can be provided in the upper plate surface of the cryogenic plate. For easier mounting of the objects in an optical set-up, these securing means can be the same ones as the securing means in the table top and can additionally be arranged in such a way that they can be aligned to the same grid.

According to a further design according to the invention, the cryocooler can be connected to the reinforcing structure rigidly or via a further damping device for the further mechanical decoupling thereof from the table top.

According to a further design according to the invention, in each case at least one flange can be arranged around the—preferably circular disc-shaped—cryogenic plate at least on the upper plate surface and/or on a lower plate surface. The flanges are, for example, likewise circular and preferably correspond to an engineering standard e.g. with respect to sealing face, sealing means and also securing openings and the vacuum tightness required for the particular experiment, with the result that a plurality of devices can be connected to counter flanges conforming to the same standard. In particular, an external flange can be designed for room temperature and an internal flange can be designed for cryogenic temperatures from the temperature of liquid nitrogen via the temperature of liquid helium down to the millikelvin range.

According to a further design according to the invention, the cryogenic plate can be secured to the table top, in particular rigidly. Advantageously, adjustable connecting elements such as for instance adjusting screws are used for this purpose so that the plate surface can be adjusted with respect to the table surface in terms of the horizontal and vertical position, horizontal and vertical angular alignment, optionally the alignment of the respective securing means. This makes it easier to mount an optical experimental set-up and avoids the need for a re-adjustment required because of mechanical displacements.

According to a further design according to the invention, in addition a hood with at least one optical window, pump feed lines, preferably vacuum-tight ducts for electrical cables or mechanical devices such as manipulators for the objects and/or also optical shutters can be provided. In particular, the hood mounted on the cryogenic plate can enclose on all sides a cavity, which is bordered at least by a partial surface of the upper plate surface of the cryogenic plate with the result that an evacuatable space forms.

The hood can, in particular, be a vacuum-compatible chamber on the open underside of which counter flanges are provided which correspond to the flanges of the cryogenic plate, with the result that a partial area of the upper plate surface forms a sealed and evacuatable space together with the inner surface of the hood.

The several optical windows for coupling light into or out of the hood, the pump feed lines and/or the other ducts can be arranged freely on the whole surface of the hood. For example, optical windows designed as round windows or as strip windows can be distributed in the hood at any height and angular arrangement over 360°. Ducts for electrical lines, manipulators or measuring probes can, for example, be provided in the hood diagonally from above and additionally circumferentially. Furthermore, a pump line, via which the evacuatable space is in fluid connection with a preferably low-vibration and vibration-decoupled pumping unit, can be connected to the hood from above. In principle, the hood can thus be configured freely according to the requirements of the experiment to be carried out.

According to a further design according to the invention, a flexible connecting structure for thermal insulation can be provided between the cryocooler underneath the optical table and the lower surface of the cryogenic plate. The connecting structure can comprise one or, for better thermal insulation against the environment, more vacuum areas lying one inside the other and sealed with respect to each other.

According to a further design according to the invention, the cryocooler can be thermally connected to the cryogenic plate via an element which is mechanically flexible at cryogenic temperatures (e.g. a few Kelvin) to room temperature. This can be, for example, a wire or meshwork made of a material with high heat conductivity such as copper, in order to be able to conduct as high a heat flow as possible from the cryogenic plate to the cryocooler for efficient cooling of the sample to be examined. According to the invention, the flexible element is designed to be low-vibration or vibration-absorbing, for example as a meshwork of copper wires or copper strands, so that coupling the vibrations of the cryocooler into the cryogenic plate is avoided as far as possible. A thermal coupling of cryogenic plate and cryocooler by a gas, fluid or contact-free by heat shields to absorb the thermal radiation of the cryogenic plate is also conceivable as an alternative.

According to a further design according to the invention, a damping control can be provided which is in operative connection with the damping device and actuates the damping device depending on detected vibrations, with the result that the table top and its table surface are kept free from vibrations.

Figure 2:
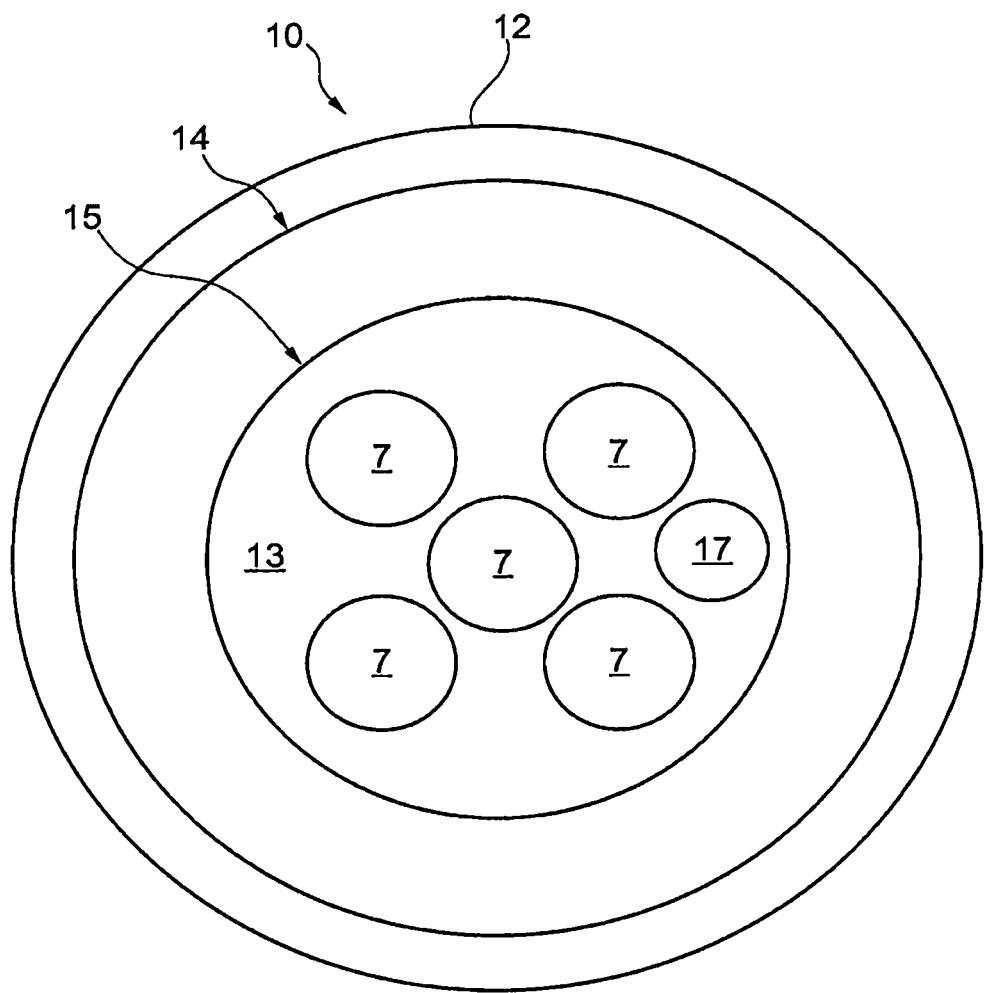
Figure 3:
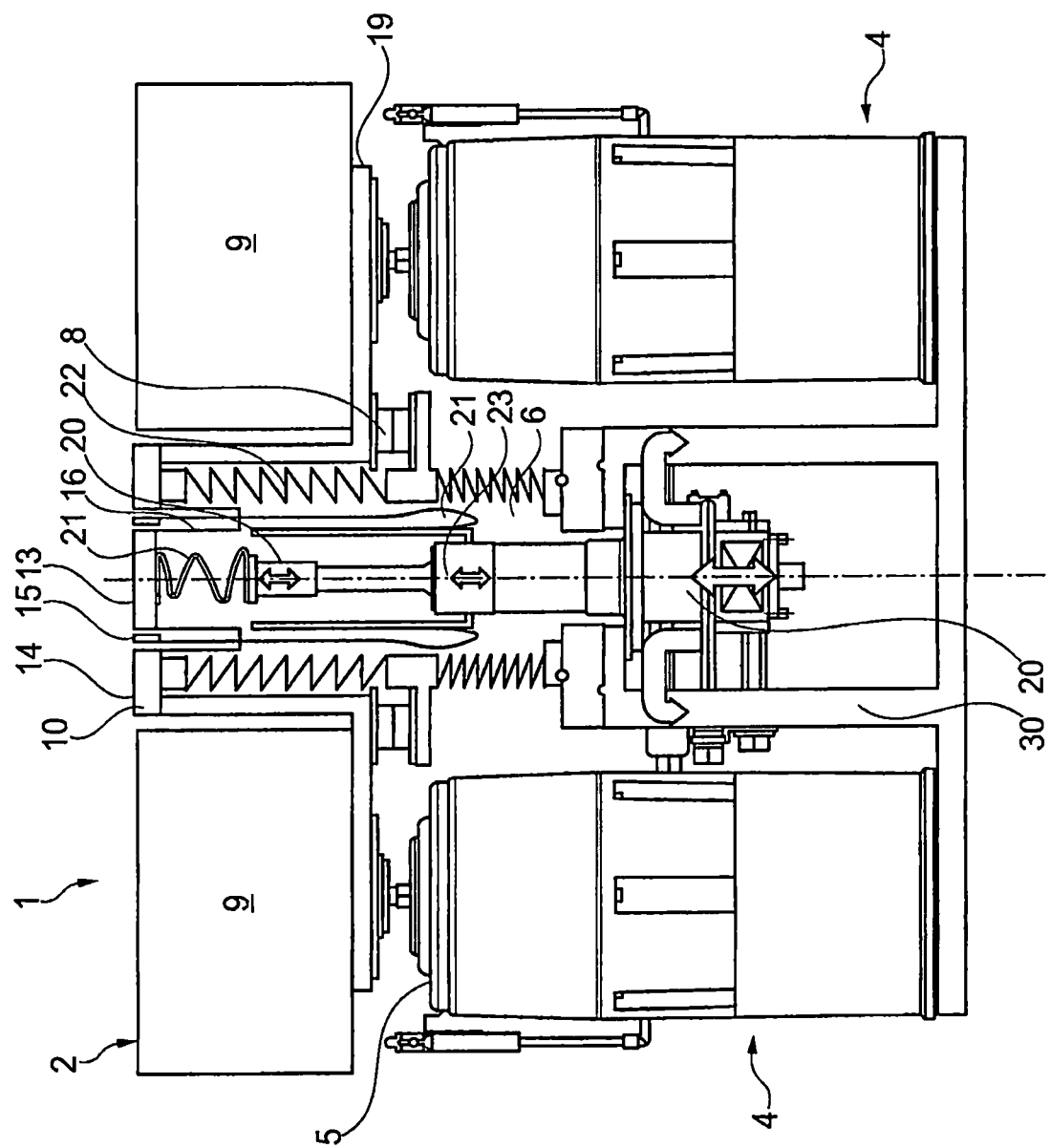
Figure 4:
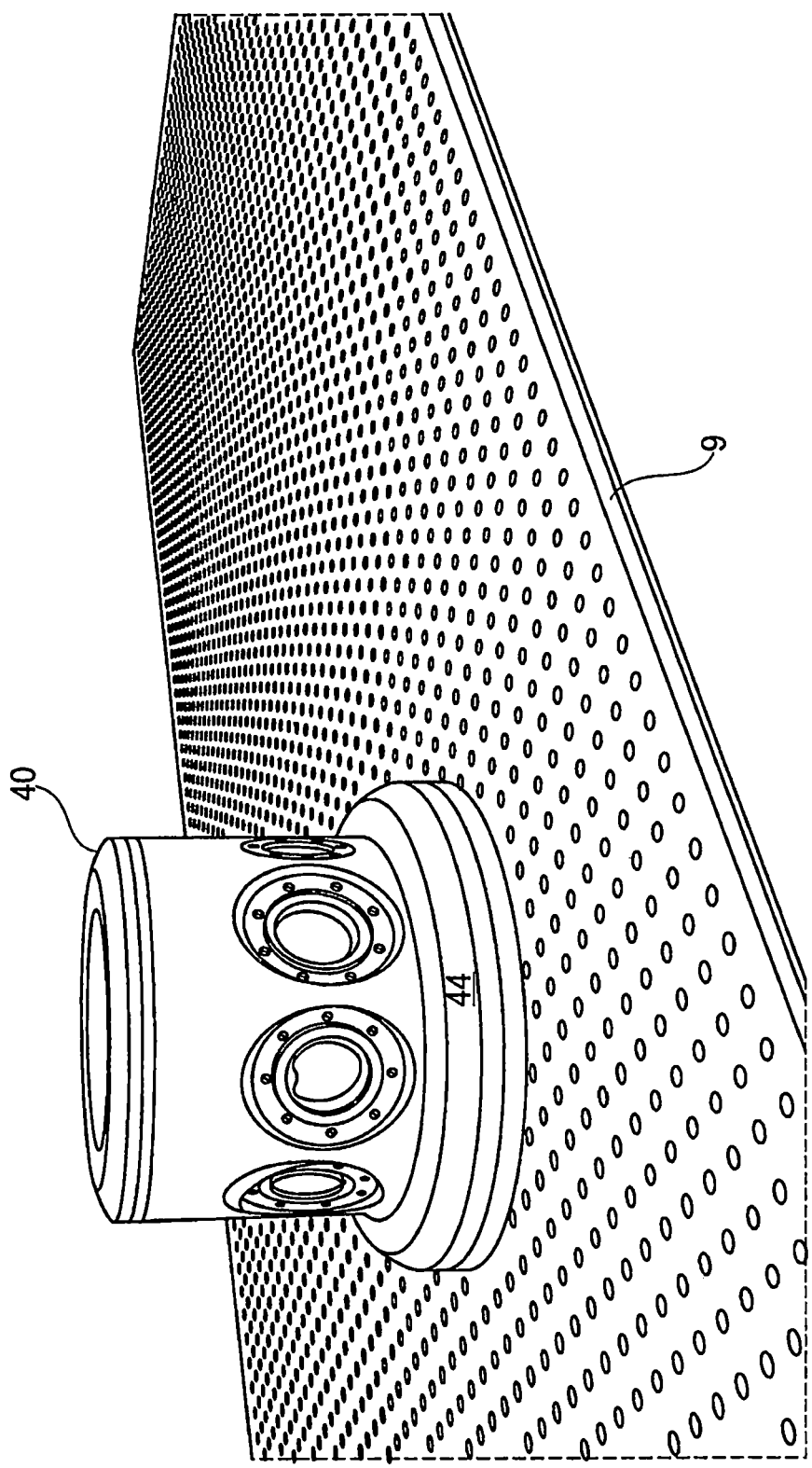
Figure 5:
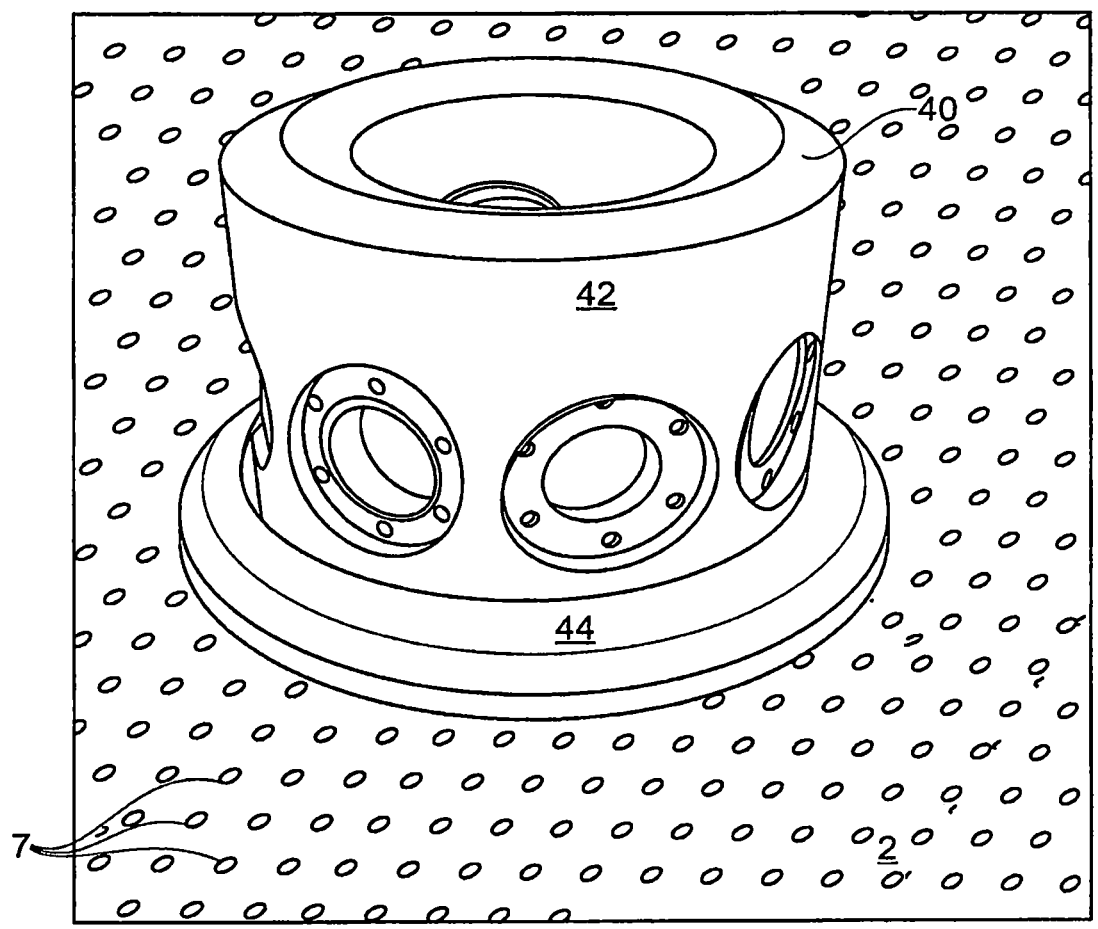
Figure 6:
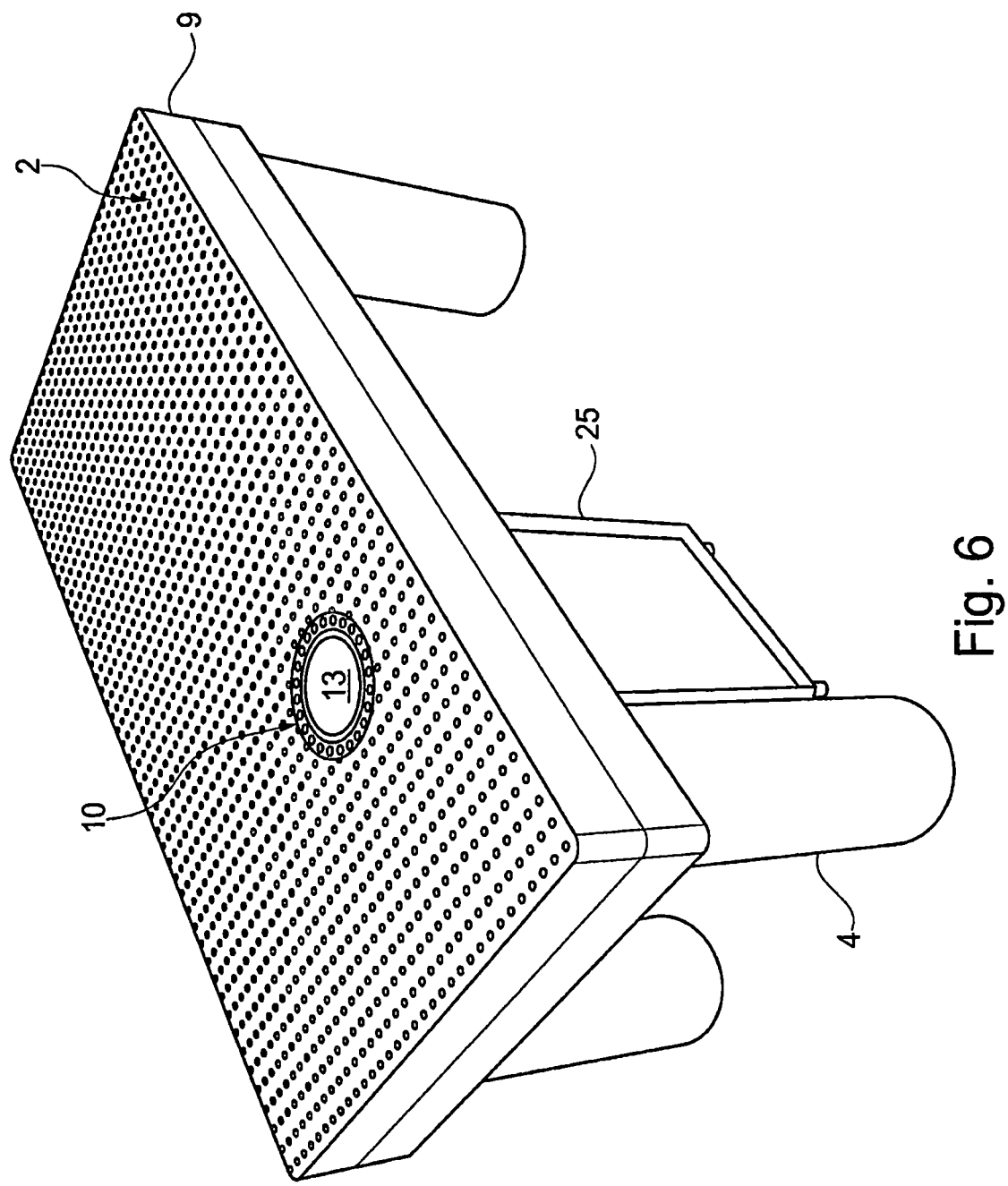
Figure 7:
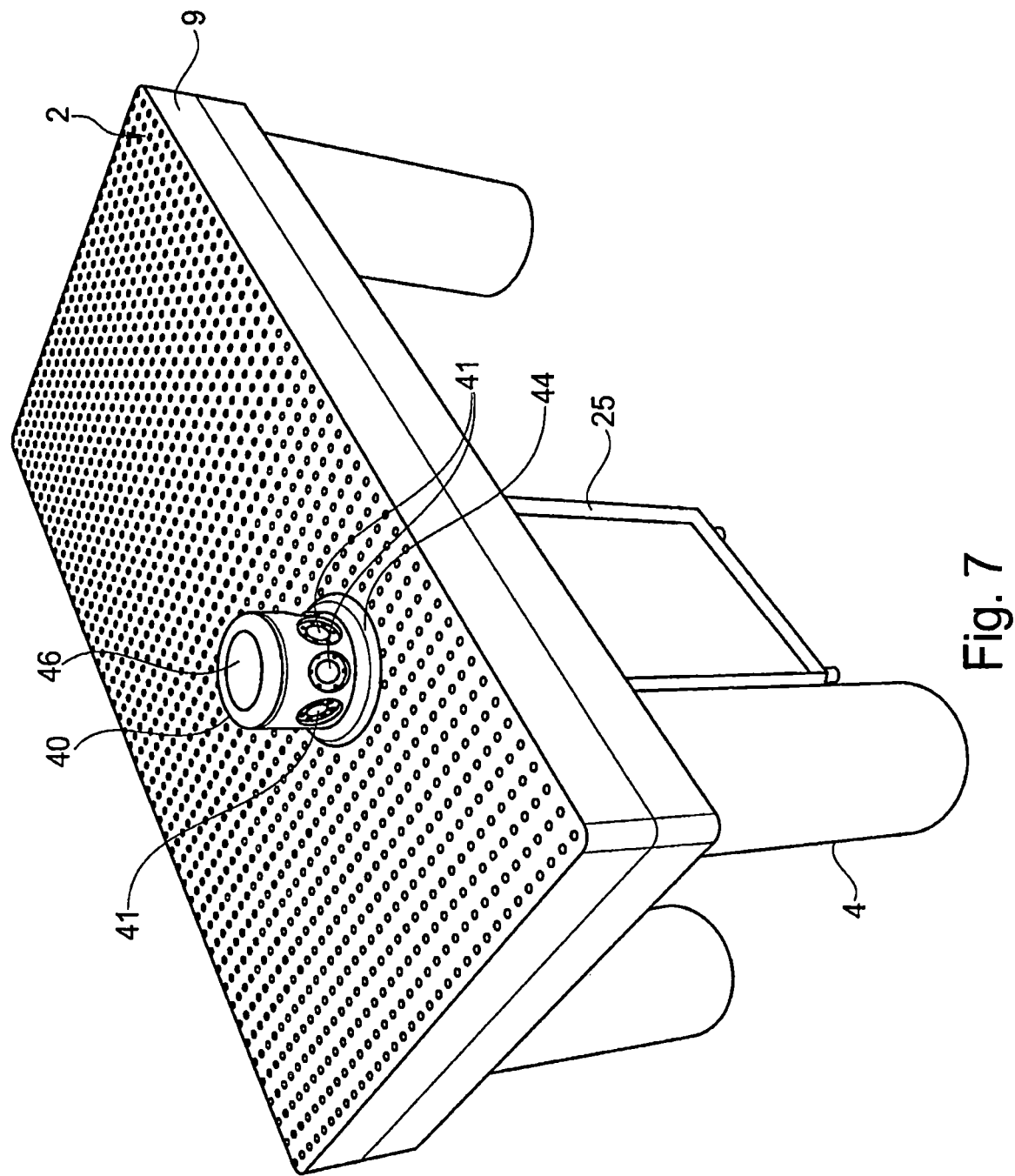

The invention and advantageous developments are illustrated in the attached figures by way of example. The same features and those having the same effect are only sometimes provided with reference numbers. The figures show:

FIG. 1 a schematic sectional view of an embodiment example of the optical table according to the invention;

FIG. 2 a schematic top view onto a cryogenic plate according to the invention;

FIG. 3 a schematic sectional view of a further embodiment example of the optical table according to the invention;

FIG. 4 a perspective view of a hood mounted on the optical table according to the invention;

FIG. 5 a perspective view of a hood mounted on the optical table according to the invention in a semi-transparent representation;

FIG. 6 a perspective view of an optical table according to the invention without a hood mounted on it and FIG. 7 a perspective view of an optical table according to the invention with a hood mounted on it.

FIG. 1 shows a schematic sectional view of an optical table 1 according to the invention. A table top 9 with a table top surface 2 lying on top is carried by table legs 4. A damping device 5 is arranged between each table leg 4 and the table top 9. In one (or more) through hole 3 in the table top 9, (in each case) a cryogenic plate 10 is secured rigidly by connecting elements 6 with the result that an upper plate surface 12 is aligned with the table surface 2. On its lower plate surface 11, the cryogenic plate 10 is in mechanical and/or fluid connection with a cryocooler 20 in a vacuum-tight manner via a mechanically flexible and connecting structure 22. The connecting structure 22 can be evacuated by a pumping unit (not shown) of the cryocooler 20. Furthermore, the lower plate surface 11 is in mechanical and thermal connection via a flexible element 21 made of a heat-conducting material such as copper, which can carry a heat flow designed for the efficient cooling of the cryogenic plate 10. The cryocooler 20 and the cryogenic plate 10 are thereby not rigidly connected mechanically and consequently can move with respect to each other at least orthogonal with respect to the table plane and are insulated from vibration or vibration-proof with respect to each other. At least two or more table legs 4 are rigidly connected to the cryocooler 20 via the reinforcing structure 30—here the floor underneath the table. By this rigid connection, the vibration-loaded movement in the direction of the normal of the table surface 2, which acts on the cryocooler 20 during evacuation of the connecting structure 22, as well as any inherent vibrations of the cryocooler 20 during operation are diverted into the connected table legs 4 and their respective damping devices 5 are compensated with respect to the table top 9 and the cryogenic plate 10 connected rigidly thereto.

FIG. 2 shows a schematic top view onto an upper plate surface 12 of a circular cryogenic plate 10 according to the invention. In the upper plate surface 12, an external room temperature flange 14 and an internal cryogenic flange 15 are formed and arranged concentrically.

FIG. 3 shows a schematic sectional view of a further development of the optical table 1 according to FIG. 1. The reinforcing structure 30 is designed such that the table legs 4 are arranged standing on it and the cryocooler 20 is secured hanging in a cavity formed as casing 25. The flexible element 21 is mechanically connected to the cryocooler 20 via a first cold stage 23 and a second cold stage 24. The first cold stage 23 and the second cold stage 24 are, for their part, thermally connected by a further flexible element 21. The rigid connection between the cryogenic plate 10 and the table top 9 is produced via a preferably adjustable carrying device 19. For the additional damping of vibrations, this carrying device 19 is connected to the flexible connecting structure 22 via further damping devices 8.

FIG. 4 shows a perspective view of a hood 40, the room temperature counter flange 44 of which is connected to the room temperature flange 14 of the cryogenic plate 10 in a form-fitting and vacuum-sealed manner. The same applies to the internal cryogenic counter flange 45 of the hood 40 which cannot be shown here and to the cryogenic flange 6 of the cryogenic plate 10. Circumferentially in the direction which is horizontal with respect to the table surface 2 and equally distributed over 360°, the hood 40 has recesses, which are not shown, in which flange-rimmed optical windows 41 are mounted. The securing means 7 for receiving optical elements are formed as a cubic grid of threaded holes in the table top 9.

FIG. 5 shows the hood 40 mounted in the optical table 1 already represented in FIG. 4 in a semi-transparent representation such that it can be seen that the upper plate surface 12 of the cryogenic plate 10 is aligned with the table surface 2. The space 42 enclosed by the cryogenic plate 10 and the hood 40 can be evacuated. For this purpose, on the one hand, an external pumping unit (not shown) can be connected to the hood 40, for example by a flexible hose (not shown). On the other hand, a through hole or a valve (not shown) can also be provided on the partial surface 13 of the cryogenic plate 10 such that the space 42 can be evacuated via a pumping unit (not shown) of the cryocooler (20). Within the meaning of the invention, evacuation means the reduction in pressure in an enclosed space 42 to below atmospheric pressure (1 bar), e.g. in the region of $10^{-4}$ mbar or $10^{-6}$ mbar or even $10^{-11}$ mbar.

FIG. 6 shows a perspective view of an optical table 1 according to the invention without a hood 40 mounted on it. The cryocooler 20 is received by a casing 25 standing on the floor (without a reference number). The rigid connection of the cryocooler 20 to at least one table leg 4 underneath the respective damping device 5 cannot be shown here.

FIG. 7 shows a perspective view of an optical table 1 according to the invention from FIG. 6 with a hood 40 mounted on it. In the upper area, the hood 40 has an inspection window 46 for visual inspection of the inside thereof by an experimenter.

By the invention disclosed here, a person skilled in the art is also prompted, where technically possible, to combine the features which are described within the context of different embodiments according to the invention.

LIST OF REFERENCE NUMBERS 1 optical table
2 table surface
3 through hole
4 table legs
5 damping device
6 connecting element
7 securing means
8 further damping devices
9 table top
10 cryogenic plate
11 lower plate surface
12 upper plate surface
13 partial surface
14 room temperature flange
15 cryogenic flange
16 thermal insulation
17 outlet or controllable valve
18 vacuum area
19 carrying device
20 cryocooler
21 flexible element
22 flexible connecting structure
23 first cold stage
24 second cold stage
25 casing
30 reinforcing structure
40 hood
41 window
42 cavity
44 room temperature counter flange
45 cryogenic counter flange
46 inspection window

The invention claimed is:
1. An optical table with a table top and a table leg, comprising:
an upper table surface of the table top for receiving objects, the table leg positioned below and supporting the table top;

a damping device for damping vibrations, the damping device arranged between the table leg and the table top;

a cryocooler and a cryogenic plate, a through-hole provided in the table top above the cryocooler, and in which the cryogenic plate is arranged, the cryocooler being positioned below the table top, wherein the cryogenic plate is in thermal contact with and is cooled by the cryocooler; and a reinforcing structure positioned below the damping device and between the cryocooler and the table leg, the table leg being rigidly connected to the cryocooler via the reinforcing structure, wherein the damping device arranged between the table leg and table top cushions the table top with respect to the cryocooler and a flooring area below the table leg.

2. The optical table according to claim 1, wherein the reinforcing structure is rigidly connected to the table leg underneath the damping device and the cryocooler is supported on the reinforcing structure and is connected to the latter.

3. The optical table according to claim 1, wherein an upper plate surface of the cryogenic plate is flush with the table surface of the table top.

4. The optical table according to claim 3, wherein the upper plate surface of the cryogenic plate includes at least one fastener for securing the objects.

5. The optical table according to claim 1, wherein the cryocooler is rigidly connected to the reinforcing structure.

6. The optical table according to claim 3, wherein at least one flange is arranged around the cryogenic plate at least on the upper plate surface and/or on a lower plate surface.

7. The optical table according to claim 1, wherein the cryogenic plate is secured to the table top.

8. The optical table according to claim 3 further comprising a hood with at least one optical window, the hood being selectively mounted in a form-fitting manner on the upper plate surface along a circumferential contour to surround the cryogenic plate.

9. The optical table according to claim 8, wherein the hood mounted on the cryogenic plate encloses on all sides a cavity, which is bordered at least by a partial surface of the upper plate surface of the cryogenic plate.

10. The optical table according to claim 1, wherein between the cryocooler under the optical table and the lower surface of the cryogenic plate, a flexible connecting structure is provided, which comprises at least one space that can be evacuated.

11. The optical table according to claim 1, wherein the cryocooler is thermally connected to the cryogenic plate via a mechanically flexible element.

12. The optical table according to claim 1, wherein a damping control is provided which is in operative connection with the damping device and actuates the damping device depending on detected vibrations.

13. The optical table according to claim 1, wherein the damping device is arranged between the table leg and a lower surface the table top.

14. The optical table according to claim 1, wherein the table leg includes the damping device.

15. The optical table according to claim 1 further comprising a second leg and second damping device arranged between the second table leg and the table top.

* * * * *